Dec. 16, 1952   G. L. McPHERSON   2,621,697
LOCK NUT
Filed Sept. 15, 1950
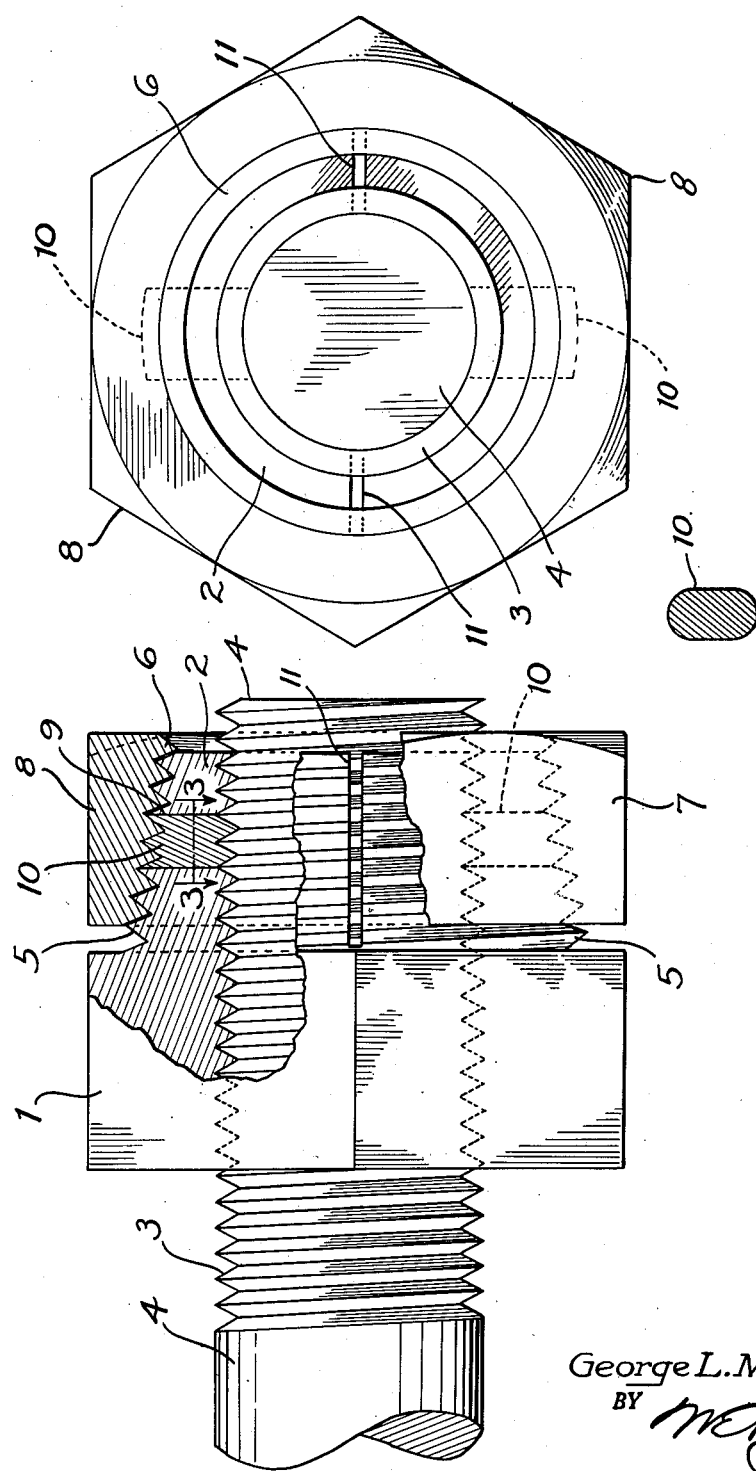
INVENTOR.
George L. McPherson Patented Dec. 16, 1952

2,621,697

UNITED STATES PATENT OFFICE 2,621,697

LOCK NUT

George L. McPherson, Lebanon, Oreg.

Application September 15, 1950, Serial No. 184,930

4 Claims. (Cl. 151—19)

This invention relates to a threaded lock nut and a keeper member for maintaining such a lock nut in any desired position upon a bolt or shaft. It has, as one object thereof, the provision of one or more keeper member actuated pins slidable through radial holes formed in a lock nut. These pins grip the periphery of the bolt or shaft and, thereby, securely hold the lock nut in place.

Where bolts or shafts are employed in vehicles or machinery which are subject to vibration, the nuts thereon often work loose due to such vibration or to wear of the parts secured by the bolts. Accordingly, lock nuts, keys and splines, or cotter pins are commonly employed to maintain the nuts holding such bolts or shafts in their desired position. Numerous disadvantages are inherent in the use of such devices. Thus, the common key and spline or cotter pin securing means in use today are not adapted for quick and convenient adjustment of the nut should such adjustment become necessary due to a wear of the secured machine parts. Furthermore, many lock nuts which are in common use cannot be readily detached from the bolt or shaft they secure and other common lock nuts employ securing crimps or pins which bite into and thus injure the bolt threads or the shaft periphery. A lock nut construction embodying my invention overcomes these disadvantages and is susceptible of quick and convenient detachment for adjustment. Yet, while holding the bolt or shaft securely, it will not injure the threads or periphery thereof.

One of the objects of my invention, therefore, is to provide a lock nut construction with internal threads over the entire bolt contact surface so the bolt threads will not be injured during the locking operation.

Another object of my invention is to provide an internally threaded lock nut with a wall portion having radial holes therethrough. Into these holes I place slidable set pins, slightly longer than the thickness of the wall portion, so that an overlying external keeper member will force the pins radially inward to grip the periphery of the bolt and thereby secure the lock nut in place.

A further object of my invention is to thread both ends of the aforementioned set pin and to taper the external surface of the lock nut complementary to the internal surface of a keeper member so the keeper member will, in effect, push the set pin radially inward yet the threads on the pin will mesh with and prevent damage to the bolt threads.

These and other objects and advantages of my invention will be described with reference to the accompanying drawing, wherein:

Fig. 1 is a side view, partially broken away, showing the lock nut, keeper member, and radial pins of my invention in operative position on a threaded shaft;

Fig. 2 is an end view of the Fig. 1 structure showing the preferred set pin construction in dashed outline; and Fig. 3 is an enlarged detail view, taken substantially on the line 3—3 of Fig. 1, showing the preferred noncircular construction of one of my set pins.

The lock nut of my invention is shown with hexagonal tool engaging faces 1 and a wall or axially protuberant tube portion 2. The internal bore of the lock nut is tapped with threads which conform to the external threads 3 on a bolt or shaft 4. The protuberant tube portion 2 is also threaded externally, as at 5, with a tapered thread which conforms to the internal tapered thread 6 tapped in a keeper member 7. This keeper member 7 is also provided, in my preferred embodiment, with hexagonal tool engaging faces 8. Thus, the same wrench or tool may be used to tighten both the lock nut and the keeper member.

It is the construction of the protuberant tube portion 2 of my lock nut which is of critical importance. Thus, I prefer to pierce this tube portion with a series of opposed radial holes 9 into which I fit slidably a corresponding series of set pins 10. While the number of set pins 10 thus utilized is not of critical importance, if more than one such pin is used, I prefer to locate them in diametrically opposed positions about the protuberant tube portion. Thus, as seen in Fig. 2, if two set pins 10 are deemed expedient in a particular construction, they function most efficiently when placed opposite to each other. Still further, the cross sectional shape of each pin is not of critical importance, but I do suggest that they be of noncircular shape so that they will not rotate in the holes 9. The protuberant portion 2 of my lock nut is further modified in that I prefer to longitudinally slit or spline said portion to make the tube walls flexible and constrictive, as shown at 11. Thus, when the keeper member 7 is screwed onto the taper threads of the lock nut, the slits 11 allow the separate portions of the protuberant tube 2 to bend or flex slightly toward one another thereby to grip more tightly, the periphery of the bolt threads 3.

The radially disposed set pins 10 of my invention are of unique construction in that they are somewhat longer than the holes 9 into which they fit and they are threaded on one or both ends. Thus, as shown in Fig. 1, the outer end of each pin is taper threaded to conform to the corresponding taper threads 5 and 6 on the lock nut and keeper member, respectively. The inner end of each pin is threaded to conform to the uniform threads tapped in the bore of the lock nut and formed, as at 3, on the bolt or shaft 4. These threads result in the formation of a set pin which has a concave inner face and a convex outer face. (See Fig. 2). Furthermore, as shown in Fig. 3, each set pin is made noncircular in section and the corresponding holes 9 are also made noncircular so that the set pins will not rotate in the holes.

I have also discovered that the location of the set pin holes 9 is often of critical importance. Thus, although each set pin is slightly longer than the mated hole in which it slides, the taper threads 6 on the keeper member 7 must completely overlie the end of the set pin 10 if the pin is to effect a full grip upon the periphery of the bolt threads 3. I have assured such a result by locating each of the holes 9 intermediate the ends of the protuberant tube portion 2 of the lock nut. That is to say, the taper threads 5 and 6 on the lock nut and keeper member, respectively, are correlated so that a tight grip will be effected therebetween when the keeper member is one or two threads short of the hexagonal faces 1 on the lock nut and, in this position, the keeper member 7 completely overlies each of the holes 9 and pins 10. A further utility will result from the use of my lock nut invention if the correlated 90° location of the slit 11 and pin 10 which is shown in Fig. 2, is utilized. Thus, as therein shown, the tube portion 2 of the lock nut has two oppositely located slits 11 and, at right angles thereto, has two oppositely located set pins 10. This 90° and opposed slit and pin location is most efficient since the gripping action of the two flexed halves of the tube portion 2 and the gripping action of the two set pins 10 are thereby made cumulative. Thus, the lock nut is maintained in the desired position upon the bolt or shaft 4 by the concurrent action of two separate grips.

In the use of my lock nut, either of two separate modes of operation may be employed. The first mode, and the one which I prefer, contemplates forming the set pins 10 and holes 9 of almost identical size so that friction will hold the set pins loosely in place within the holes without the aid of the keeper member 7. If this construction is utilized, the set pins 10 are placed in the holes 9 prior to the assembly of the lock nut upon the bolt or shaft 4. The keeper member 7 is kept separate and the lock nut itself is adjusted upon the threads 3 of the bolt to any desired location by gripping the hexagonal faces 1 with an appropriate tool. After the lock nut is adjusted in position, the keeper member 7 is screwed onto the tube portion 2 thereof. As the taper threads 5 and 6 on the lock nut and keeper member respectively engage, and as the keeper member is cinched tight, the split halves of the tube portion 2 are crimped together about the threads 3 on the bolt and the set pins 10 are forced radially inward to mesh with and hold the same threads.

The second mode of applying my lock nut to a bolt is to first remove the pins 10 from the holes 9 and to rotate the lock nut part way into position. That is to say, the lock nut should be moved along the bolt threads 3 only until the holes 9 overlie a portion thereof. Thereafter, the set pins 10 are inserted into the holes and the keeper member 7 is loosely rotated into place so that it overlies the ends of the set pins 10 to prevent them from falling out. The entire assembly is then adjusted on the bolt threads 3 until the lock nut is in the desired position. In this mode of operation, the last step is to tighten the keeper member 7 on its taper threads so the set pins and tube portion 2 grip the periphery of the bolt threads.

Whichever method of adjusting the lock nut is employed, it will be seen that the threaded ends of the set pins 10 ride freely over the bolt threads 3 and are held securely in place by the tapered keeper threads 6. Therefore, vibration will not loosen the lock nut yet a quick and convenient adjustment or detachment is provided. Should the lock nut require adjustment due to a wearing of the parts which it secures in place, an easy adjustment can be had by gripping the hexagonal faces 8 of the keeper with a tool and backing the keeper off slightly. Thereafter, the lock nut hexagonal faces 1 can be engaged by the same tool and accurately adjusted into position. The keeper member 7 can then be tightened and a secure, effective grip is once more effected.

My invention thus requires the use of but a single tool to effect a quick adjustment or detachment. In accord with the objects thereof, my invention provides a lock nut with radial holes and threaded radial pins whereby a sure and effective grip is effected upon the threads of a bolt or the periphery of a shaft without damaging the threads formed thereon. Furthermore, I have provided a taper thread on the protuberant tube portion of my lock nut and in the internal bore of my keeper member whereby the set pins, which are longer than the hole into which they fit, are forced radially inward to grip the periphery of a bolt or shaft. Vibration, as found in many modern vehicles and machines, is thus anticipated and, in effect, rendered harmless.

I claim:

1. A lock nut having a non-circular tool engaging periphery and an axially projecting tube portion, said tube portion having a uniform bore carrying internal threads and a tapered periphery carrying external threads, said tube portion being longitudinally split and being radially pierced by a hole extending through the wall of said tube portion intermediate the ends of the latter, a metal set pin prethreaded on both ends to conform to the internal and external threads of said tube portion, said set pin being slidably carried in said hole, said metal pin being slightly longer than the thickness of the adjacent wall portions of said tube, and a keeper with internal threads engaging the tapered threaded periphery of said tube and the corresponding threaded end of said pin, said keeper overriding said pin end to force the same inwardly and to flex said tube split portion.

2. The combination defined in claim 1 modified in that said set pin and the hole which it slidably engages are of noncircular cross section.

3. The combination defined in claim 1 modified in that there are two set pins in substantial alignment with each other and being diametrically opposed to each other whereby they will be forced inwardly by said keeper in opposition to each other.

4. The combination defined in claim 1 modified in that said pin in its hole is frictionally held in its hole against movement thereby to remain at rest in the absence of the application of external force to slide it endwise in said hole.

GEORGE L. McPHERSON.

REFERENCES CITED

The following references are of record in the file of this patent:

UNITED STATES PATENTS

| Number | Name | Date |
| --- | --- | --- |
| 770,435 | Lawrence | Sept. 20, 1904 |
| 876,081 | Orr | Jan. 7, 1908 |
| 914,908 | Young | Mar. 9, 1909 |
| 919,034 | Lamotte | Apr. 20, 1909 |
| 972,968 | Wismer | Oct. 18, 1910 |
| 1,030,106 | Mathews | June 18, 1912 |
| 1,137,042 | Willison | Apr. 27, 1915 |
| 1,154,265 | Miller | Sept. 21, 1915 |
| 1,609,563 | Loy | Dec. 7, 1926 |
| 2,424,242 | Krause | July 22, 1947 |
| 2,481,762 | Lewis | Sept. 13, 1949 |
| 2,544,096 | Laughlin | Mar. 6, 1951 |

FOREIGN PATENTS

| Number | Country | Date |
| --- | --- | --- |
| 362,791 | France | July 9, 1906 |
| 495,195 | Great Britain | Nov. 8, 1938 |
| 496,638 | Great Britain | Dec. 2, 1938 |